United States Patent [19]

Viot et al.

[11] Patent Number: 5,295,229
[45] Date of Patent: Mar. 15, 1994

[54] CIRCUIT AND METHOD FOR DETERMINING MEMBERSHIP IN A SET DURING A FUZZY LOGIC OPERATION

[75] Inventors: J. Greg Viot, Austin; James M. Sibigtroth, Round Rock; James L. Broseghini, Austin, all of Tex.

[73] Assignee: Motorola, Inc., Schaumburg, Ill.

[21] Appl. No.: 899,975

[22] Filed: Jun. 17, 1992

[51] Int. Cl.$^5$ .............................. G06F 15/18
[52] U.S. Cl. .............................. 395/51; 395/3; 395/11; 395/900
[58] Field of Search ............ 395/3, 51, 900, 11, 395/61

[56] References Cited

U.S. PATENT DOCUMENTS

| | | | |
|---|---|---|---|
| 4,694,418 | 9/1987 | Ueno et al. | 395/3 |
| 4,716,540 | 12/1987 | Yamakawa | 395/3 |
| 4,860,243 | 8/1989 | Ueno et al. | 395/3 |
| 5,136,685 | 8/1992 | Nagazumi | 395/3 |
| 5,148,977 | 9/1992 | Hibino et al. | 395/61 |
| 5,165,011 | 11/1992 | Hisano | 395/51 |
| 5,179,634 | 1/1993 | Matsunaga et al. | 395/51 |
| 5,189,636 | 2/1993 | Patti et al. | 364/786 |

OTHER PUBLICATIONS

"Implementing Fuzzy Expert Rules in Hardware" in the Apr. 1992 issue of AI Expert, vol. 7 No. 4, pp. 25 through 31, written by James M. Sibigtroth.
"Creating Fuzzy Micros" in the Dec. 1991 issue of Embedded Systems Programming, vol. 4, No. 12, pp. 1-10, written by James M. Sibigtroth.
User's Manual entitled "FP-3000 Digital Fuzzy Processor User's Manual" published by Omron Corporation.

Primary Examiner—Michael R. Fleming
Assistant Examiner—Tariq R. Hafiz
Attorney, Agent, or Firm—Elizabeth A. Apperley

[57] ABSTRACT

A circuit (14) and method which determine a degree of membership of an input in a membership set during a fuzzy logic operation. The degree of membership is calculated by a single "MEM" software instruction. The MEM instruction determines whether the system input has a degree of membership of zero, of a saturation level, or of some value in between. An operand assignment circuit (50) and an ALU (56) allow circuit (14) to determine the degree of membership more quickly. Assignment circuit (50) determines a multiplier for a multiplication operation based on a number of significant bits in the values to be multiplied. If the multiplier is smaller than the multiplicand, shorter multiplication operations may be performed. Additionally, ALU (56) operates in a split mode of operation which is able to perform two eight bit subtraction or multiplication operations concurrently which also results in these operations being performed more efficiently.

17 Claims, 7 Drawing Sheets

CIRCUIT AND METHOD FOR DETERMINING MEMBERSHIP IN A SET DURING A FUZZY LOGIC OPERATION

CROSS REFERENCE TO RELATED APPLICATION

This application is related to a copending patent application filed concurrently herewith and entitled: "A CIRCUIT AND METHOD FOR EVALUATING FUZZY LOGIC RULES" by J. Greg Viot et al., Ser. No. 07/899,968.

FIELD OF THE INVENTION

This invention relates generally to a data processing system, and more particularly to execution of a fuzzy logic operation in a data processing system.

BACKGROUND OF THE INVENTION

Data processors have been developed to function as binary machines whose inputs and outputs are either interpreted as ones or zeroes, and no other possibilities may exist. While this works well in most situations, sometimes an answer is not simply "yes" or "no," but something in between. A concept referred to as "fuzzy logic" was developed to enable data processors based on binary logic to provide an answer between "yes" and "no."

Fuzzy logic is a logic system which has membership functions with fuzzy boundaries. Membership functions translate subjective expressions, such as "temperature is warm," into a value which typical data processors can recognize. A label such as "warm" is used to identify a range of input values whose boundaries are not points at which the label is true on one side and false on the other side. Rather, in a system which implements fuzzy logic, the boundaries of the membership functions gradually change and may overlap a boundary of an adjacent membership set. Therefore, a degree of membership is typically assigned to an input value. For example, given two membership functions over a range of temperatures, an input temperature may fall in the overlapping areas of both the functions labeled "cool" and "warm." Further processing would then be required to determine a degree of membership in each of the membership functions (i.e. if the input temperature fits into each of the membership sets, cool and warm).

A step referred to as "fuzzification" is used to relate an input to a membership function in a system which implements fuzzy logic. The fuzzification process attaches concrete numerical values to subjective expressions such as "the temperature is warm." These numerical values attempt to provide a good approximation of human perception which is not generally limited to an environment of absolute truths. After the fuzzification step, a rule evaluation step is executed. During execution of the rule evaluation step, a technique referred to as "min-max" inference is used to calculate numerical conclusions to linguistic rules defined by a user. Conclusions from the rule evaluation step are referred to as "fuzzy outputs" and may be true to varying degrees. Thus, competing results may be produced. A last step in the fuzzy logic process is referred to as "defuzzification." As the name implies, defuzzification is the process of combining all of the fuzzy outputs into a composite result which may be applied to a standard data processing system. For more information about fuzzy logic, refer to an article entitled "Implementing Fuzzy Expert Rules in Hardware" by James M. Sibigtroth. The article was published in the April, 1992 issue of AI EXPERT on pages 25 through 31.

Typically, the fuzzification step has been implemented with software programs which are executed either by a peripheral device or by a data processor. Such software programs calculate a degree of membership using a mathematical equation which requires extensive processing time. Therefore, although the software program provides an accurate result, the processing time generally limits the performance of a system in which it is implemented. Another common software solution implements a "table look-up" routine in which a table of data stored in memory is accessed for a value which corresponds to a particular input value. Although quicker than a mathematical calculation, the table look up routine requires a large amount of dedicated memory which is expensive to implement. Hardware solutions to the implementation of the fuzzification step provide results even more quickly. However, hardware solutions generally require a large amount of dedicated circuitry which is inflexible. Although hardware solutions to the fuzzification step are typically faster than software implementations, hardware solutions require a large amount of dedicated circuit area and are often too expensive to implement in a data processing system.

Therefore, a need exists for a circuit or method for performing the fuzzification step quickly, but without costly hardware requirements. The speed typically associated with a hardware solution is needed without the memory usually associated with a software solution.

SUMMARY OF THE INVENTION

The previously mentioned needs are fulfilled with the present invention. Accordingly, there is provided, in one form, a circuit and method for performing a fuzzy logic operation in a data processing system, the fuzzy logic operation determining membership of an input point in a predetermined membership set which is defined by a plurality of boundary values. The method includes the step of receiving a membership evaluation instruction for initiating execution of the fuzzy logic operation in the data processing system. The membership evaluation instruction is decoded to provide a plurality of control signals. A first one of the plurality of boundary values is subtracted from the input value to produce a first delta value. The input value is concurrently subtracted from a second one of the plurality of boundary values to produce a second delta value. The first delta value and a third one of the plurality of boundary values are multiplied to provide a first result. The second delta value and a fourth one of the plurality of boundary values are concurrently multiplied to provide a second result. The degree of membership signal is provided to indicate that the input point is not included in the predetermined membership set when either the first delta value or the second delta value is less than zero. The degree of membership signal is equal to a minimum value of either the first result, the second result, or a fifth one of the plurality of boundary values if neither the first delta value nor the second delta value is less than zero.

These and other features, and advantages, will be more clearly understood from the following detailed description taken in conjunction with the accompanying drawings. It is important to note the drawings are not intended to represent the only form of the invention.

DETAILED DESCRIPTION OF A PREFERRED EMBODIMENT

The present invention provides a circuit and a method for "fuzzifying" an input to a data processing system quickly and with a minimum amount of dedicated circuitry. An instruction is provided which allows the user of the data processing system to perform the fuzzification step quickly without difficult and lengthy software programs. The fuzzification step of a single input label is encoded in the instruction which executes quickly and efficiently without an excessive amount of added circuitry in the data processing system.

During a description of the implementation of the invention, the terms "assert" and "negate," and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state. Additionally, a hexadecimal value may be indicated by a "$" symbol preceding a value.

Figure 1:
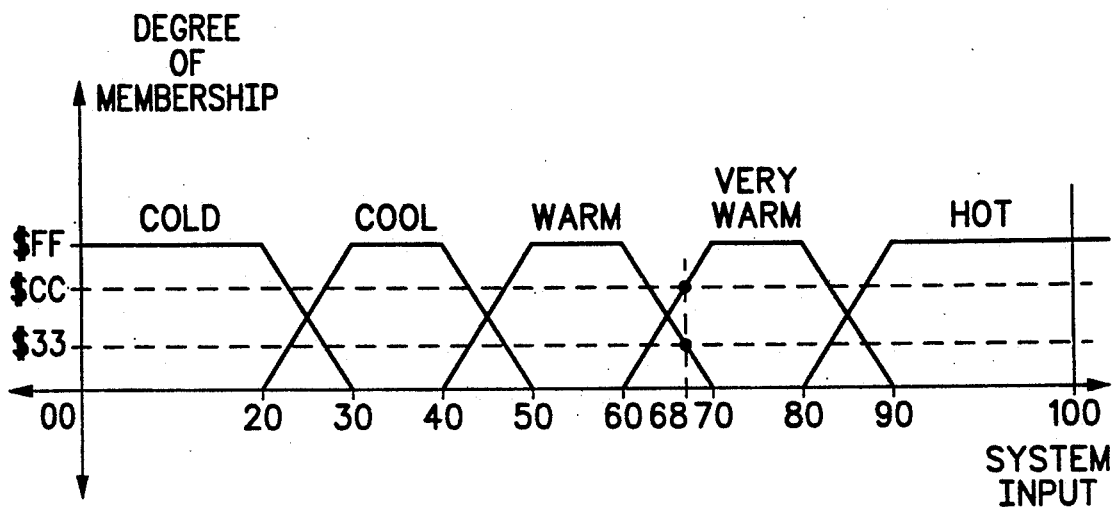
FIG. 1 illustrates in graph diagram form some of the concepts and basic terminology used to describe fuzzy logic.

FIG. 1 provides a graph illustrating a few basic terms and concepts of fuzzy logic. In the fuzzy logic system described in FIG. 1, a "system input" is temperature in degrees Fahrenheit. Five "membership functions" are provided to relate labels to ranges of temperatures. For example, from 0 degrees to 30 degrees, a temperature is labeled "cold." Similarly, from 20 degrees to 50 degrees, the temperature is labeled "cool." Notice that the boundaries of each of the membership sets overlaps the boundaries of the adjacent sets. Therefore, a temperature may be in more than one set. For example, assume that the system input indicates a temperature of 68 degrees. Referring to FIG. 1, notice that 68 degrees is within the boundaries of both the warm and very warm membership sets, and a non-zero degree of membership in each of the membership sets may be obtained. The system input has a degree of membership of $33 for the warm membership set and a degree of membership of $CC for the very warm membership set. If the system input had indicated a temperature of 75 degrees, the temperature would have had a degree of membership of $FF in the very warm membership set. Likewise, the temperature of 75 degrees would have a degree of membership of $00 in the hot membership set. In the fuzzy logic implementation of FIG. 1, a degree of membership may range from a hexadecimal value of $00 to $FF, which may corresponds to a fraction in a range of 0.00 to 0.996.

Figure 2:
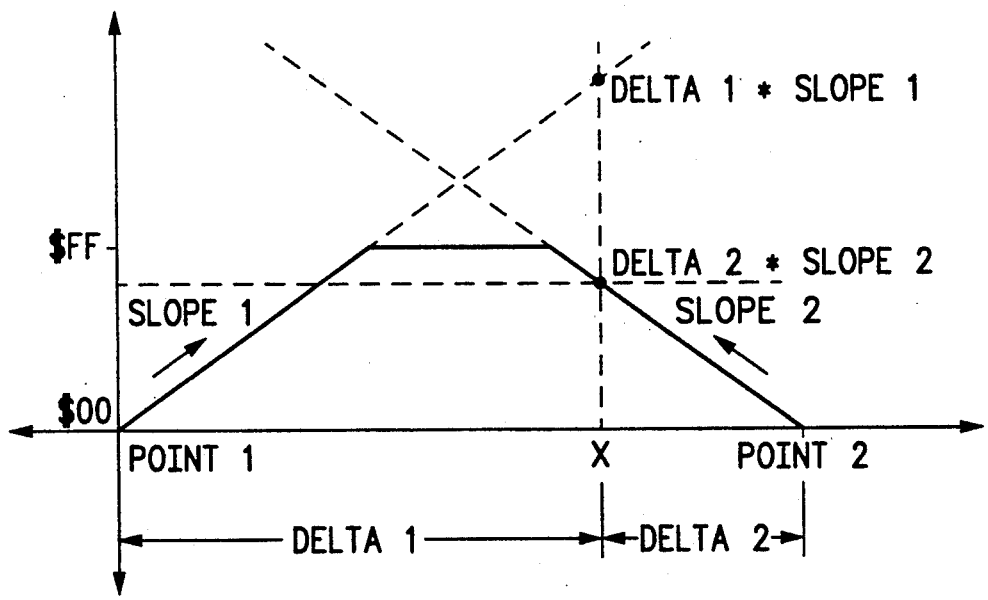
FIG. 2 illustrates a membership set of FIG. 1 in greater detail.

FIG. 2 illustrates a single membership set which may be represented by four values: Point 1, Point 2, Slope 1, and Slope 2. A first value referred to as "Delta 1" is computed as the difference between a system input (point "X") and point 1. Similarly, a second value referred to as "Delta 2" is computed as the difference between point 2 and the system input. From the computation of the Delta 1 and Delta 2 values, the degree of membership is provided in accordance with the method of the present invention. If a value of either Delta 1 or Delta 2 is less than zero, then a degree of membership for the corresponding membership set is 0.00. Otherwise, the degree of membership is equal to the minimum value of either a product of Delta 1 and Slope 1, a product of Delta 2 and Slope 2, or a saturation value. The minimum value will be a degree of membership of the current input value in the membership set being tested. In the example described herein, the saturation value has a hexadecimal value of $FF. However, other implementations may allow a user of the fuzzy logic system to choose a saturation value in accordance with the specifications of a particular system.

The instruction of the present invention, which is referred to with the mnemonic label "MEM," causes a data processing system to perform a series of steps to determine a degree of membership of a system input value in one of a plurality of membership sets. Each of the membership sets is characterized by a plurality of boundary values (Point 1, Point 2, Slope 1, and Slope 2) which are retrieved from memory. If each of the plurality of boundary values has been appropriately stored in memory and if the system input value has been appropriately stored in a register location prior to execution of the MEM instruction, a degree of membership of the system input in one of the plurality of membership sets may be determined. Subsequently, the degree of membership of the system input in each of the plurality of membership sets is stored at a predetermined location in memory. The implementation of the MEM instruction allows a user of the data processing system to perform a membership evaluation function more quickly than traditional software implementations and with less dedicated circuit area than is required by typical hardware implementations. For example, an arithmetic logic unit required for normal operation of the data processing system has been modified to operate in a split mode of operation. Typically, the arithmetic logic unit is able to perform a single sixteen bit operation at a predetermined point in time. However, the arithmetic logic unit disclosed herein may be selectively enabled to either perform a single sixteen bit operation or two concurrent eight bit operations. Therefore, arithmetic operations necessary for calculation of a degree of membership in a membership set are concurrently calculated in less time than would traditionally be required. Very little additional circuitry is required. To operate the arithmetic logic unit in the split mode of operation, a single enable signal is provided to an existing buffer circuit. Additionally, only a small amount of added circuitry is required to implement the MEM instruction.

Figure 3:
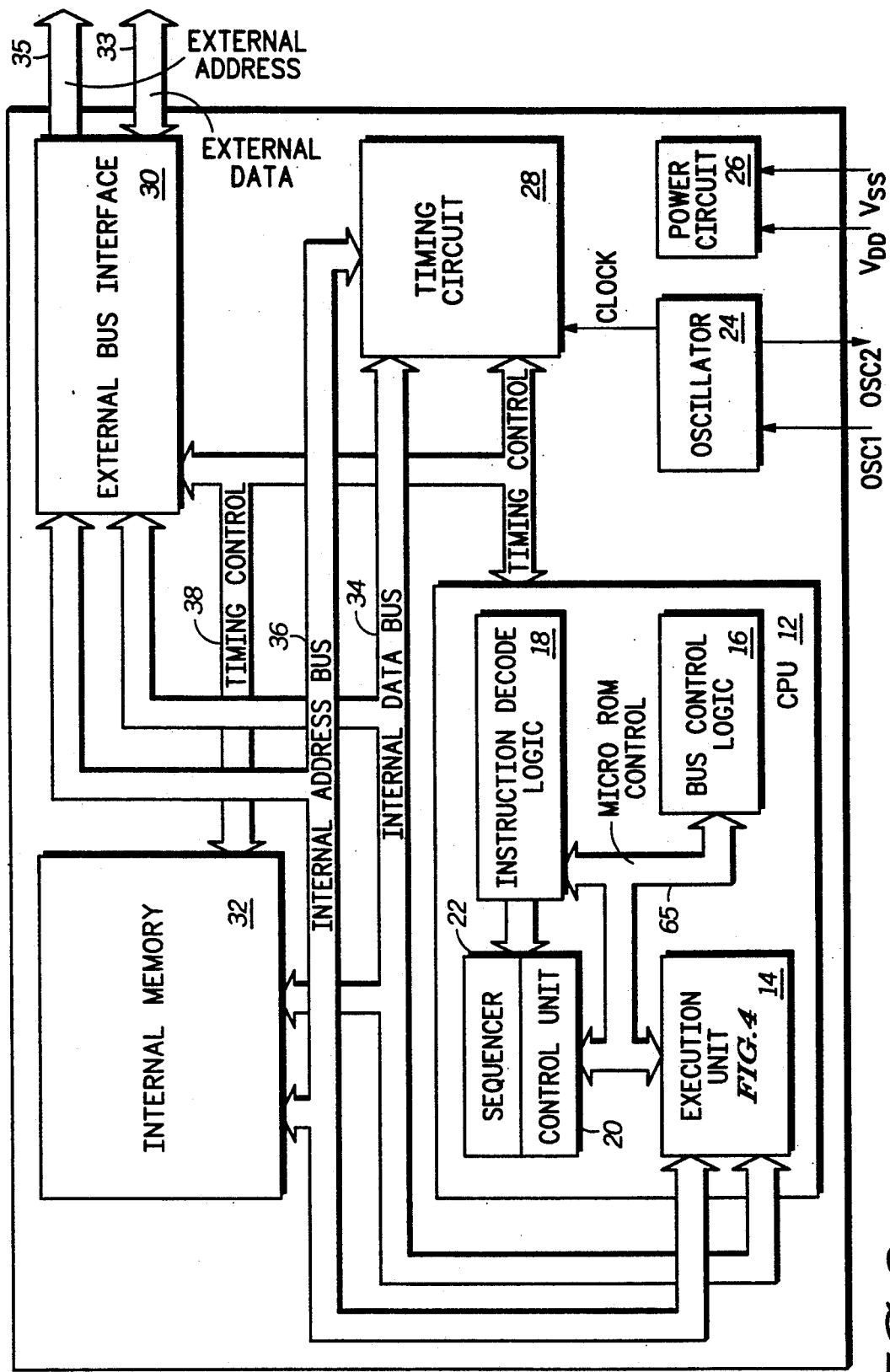
FIG. 3 illustrates in block diagram form a data processing system in accordance with the present invention.

One implementation of the instruction and method of operation described above is illustrated in FIG. 3. FIG. 3 shows a data processing system 10 in which the fuzzification instruction may be implemented. Data processing system 10 generally includes a central processing unit (CPU) 12, an oscillator 24, a power circuit 26, a timing circuit 28, an external bus interface 30, and an internal memory 32. CPU 12 generally has an execution unit 14, a bus control logic circuit 16, an instruction decode logic circuit 18, a control unit 20, and a sequencer 22.

During operation, an "Osc 1" signal is provided to oscillator 24 via an external source, such as a crystal. The crystal is connected between the Osc 1 and Osc 2 signals to enable the crystal to oscillate. The Osc 1 provides a "Clock" signal to a remaining portion of data processing system 10. Operation of a crystal oscillator is well known in the data processing art and should be apparent to one with ordinary skill in the art.

Similarly, power circuit 26 receives both a "Vdd" and a "Vss" signal from an external power source. The Vdd signal provides a positive 5 volts and the Vss signal provides a reference, or ground voltage. The Vdd and Vss signals are provided to each of the remaining components of data processing system 10. The routing of these signals is well known in data processing art and should be obvious to one with ordinary skill in the art.

Timing circuit 28 receives the Clock signal and subsequently provides appropriate timing signals to each of CPU 12, external bus interface 30, and internal memory 32 via a Timing Control bus 38.

A plurality of address values are provided from external bus interface 30 via an External Address bus 35. Similarly, a plurality of data values are communicated to external bus interface 30 via an External Data bus 33. External bus interface 30 functions to communicate address and data values between an external user and data processing system 10. External bus interface 30 provides a plurality of address and data values to a remaining portion of data processing system 10 via an Internal Address bus 36 and an Internal Data bus 34, respectively. Internal memory 32 functions to store information values necessary for the proper operation of data processing system 10. Additionally, other data values may be stored therein if specified in a user program provided via Internal Address bus 36 and Internal Data bus 34.

CPU 12 executes each of the instructions required during operation of data processing system 10. Internal Address bus 36 and Internal Data bus 34 communicate information between execution unit 14 and a remaining portion of data processing system 10. Bus control logic circuit 16 fetches instructions and operands. Each of the instructions is then decoded by instruction decode logic circuit 18 and provided to control unit 20 and sequencer 22. Control unit 20 and sequencer 22 maintain a sequence of execution of each of the instructions to most efficiently utilize the computing capabilities of data processing system 10. Additionally, control unit 20 includes a Micro-ROM memory (not shown) which provides a plurality of control information to each of execution unit 14, bus control logic 16, and instruction decode logic 18 via a Micro-ROM Control Bus 65.

Figure 4:
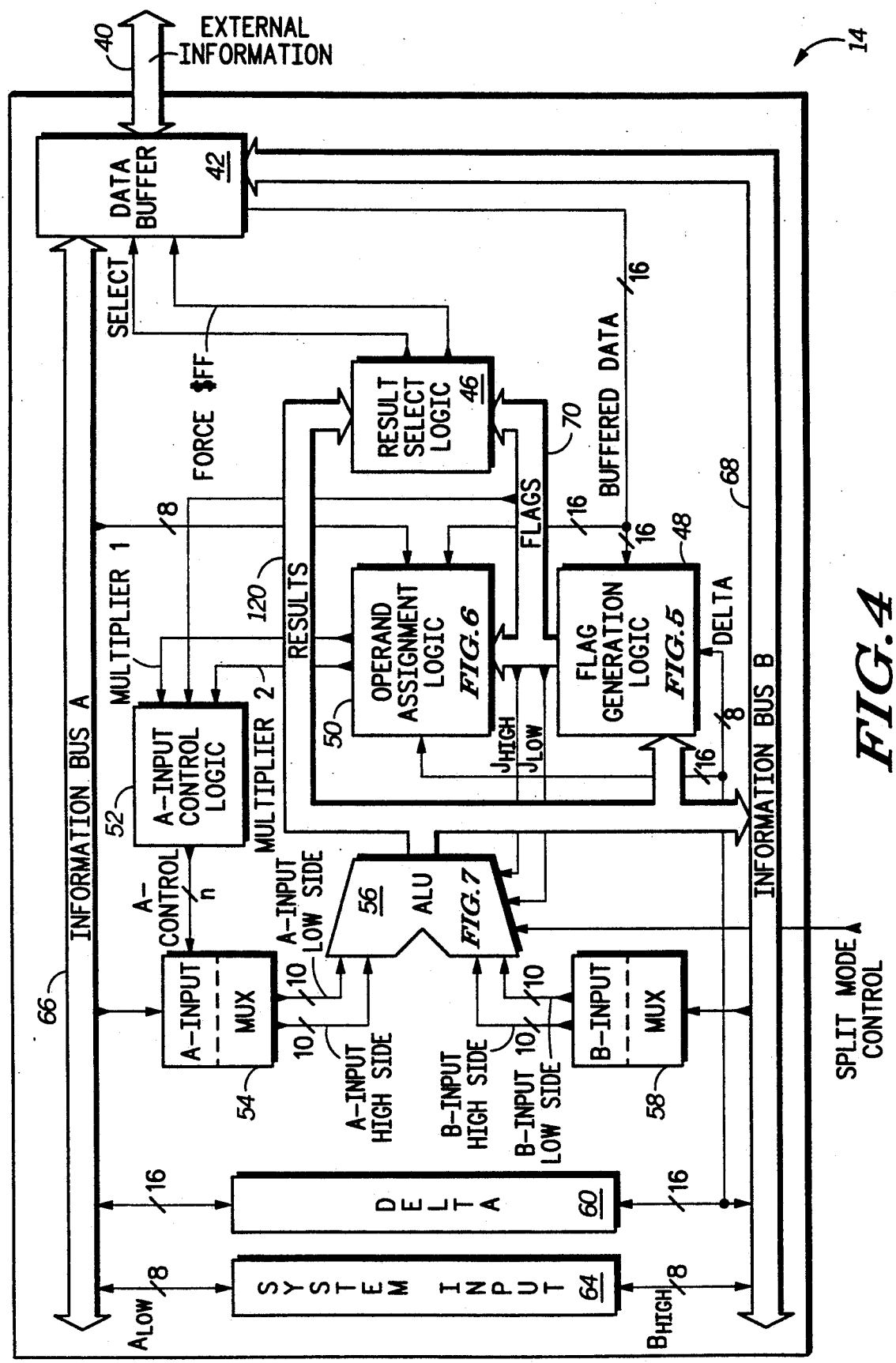
FIG. 4 illustrates in block diagram form an execution unit of FIG. 3.

Execution unit 14 is illustrated in greater detail in FIG. 4. Execution unit 14 generally includes a data buffer 42, a result select logic circuit 46, a flag generation logic circuit 48, an operand assignment logic circuit 50, an A-input control logic circuit 52, an A-input multiplexor 54, an arithmetic logic unit (ALU) 56, a B-input multiplexor 58, a first data register 60, and a system input register 64. Although not shown herein, it should be apparent to one with ordinary skill in the art that additional registers may be included in execution unit 14. For example, execution unit 14 may include an index register or an accumulator. Additionally, in typical data processing systems, system input register 64 may be implemented as an accumulator.

An External Information bus 40 provides address and data information to data buffer 42. External Information bus 40 receives the address and data information from Internal Address bus 36 and Internal Data bus 34, respectively. Data buffer 42 provides the values transferred via External Information bus 40 to a remaining portion of execution unit 14 via an Information Bus A 66 and an Information Bus B 68. Although not shown in detail here, both Information Bus A 66 and Information Bus B 68 are sixteen bits wide and are divided into a high side (bit 15 through bit 8) and a low side (bit 7 through bit 0).

The low side of Information Bus A 66 is bidirectionally coupled to a first input of system input register 64. Similarly, the high side of Information Bus B 68 is bidirectionally coupled to a second input of system input register 64. A first delta value referred to as "Delta 1" is provided to a first input of delta register 60 via a high side of Information Bus B 68. A second delta value, "Delta 2," is provided to a second input of delta register 60 via a low side of Information Bus B 68. Delta register 60 is also connected to both Information Bus A 66 and Information Bus B 68 to provide information to other components of execution unit 14. Any additional registers such as accumulators and index register would be similarly coupled to Information Bus A 66 and Information Bus B 68.

Information Bus A 66 is connected to a first input of A-input multiplexor 54. An n-bit wide signal labeled "Control" is provided to a second input of A-input multiplexor 54, where n is an integer. A-input multiplexor 54 provides both a first ten bit output labeled "A-input Low Side" to a first input of ALU 56 and a second ten bit output labeled "A-input High Side" to a second input of ALU 56.

Information Bus B 68 is connected to an input of B-input multiplexor 58. Control information necessary to enable B-input multiplexor 58 to function correctly is provided to a control input via a plurality of signals generated by the Micro-ROM (not shown) in control unit 20 and transferred via Mircor-ROM Control bus 65. B-input multiplexor 58 provides a first ten bit output labeled "B-input Low side" to a third input of ALU 56. Additionally, B-input multiplexor 58 provides a second ten bit output labeled "B-input High side" to a fourth input of ALU 56.

A signal labeled "Split Mode Control" is provided to a fifth input of ALU 56. The Split Mode Control signal is generated by the Micro-ROM memory in control unit 20 in response to execution of the MEM instruction. ALU 56 processes each of the inputs to provide a plurality of results which are transferred via a Results bus 120. Results bus 120 provides a plurality of information values to each of result select logic circuit 46 and flag generation logic circuit 48. Additionally, Results bus 120 is coupled to Information bus B 68.

In addition to Results bus 120, flag generation logic circuit 48 is coupled to both delta register 60 and data buffer 42. Flag generation logic 48 receives a "Delta"

signal from delta register 60 and a "Buffered Data" signal from data buffer 42. Flag generation logic circuit 48 is also coupled to both operand assignment logic circuit 50 and result select logic circuit 46 to provide a plurality of flag values via a Flags bus 70. Additionally, flag generation logic circuit 48 is coupled to ALU 56 to provide a $J_{high}$ and a $J_{low}$ signal to a sixth and seventh input of ALU 56, respectively.

Operand assignment logic circuit 50 is also connected to Information bus A 66, Information bus B 68, and Flags bus 70. Operand assignment logic circuit 50 is connected to A-input control logic circuit 52 to provide both a first input signal labeled "Multiplier 1" and a second input signal labeled "Multiplier 2." Additionally, operand assignment logic circuit 50 is coupled to delta register 60 to receive the Delta signal. A-input control logic 52 is connected to A-input multiplexor 54 to provide the Control signal.

Result select logic 46 receives information via both Flags bus 70 and Results bus 120. The information is processed to provide a first output labeled "Select" and a second output labeled "Force $FF."

Figure 5:
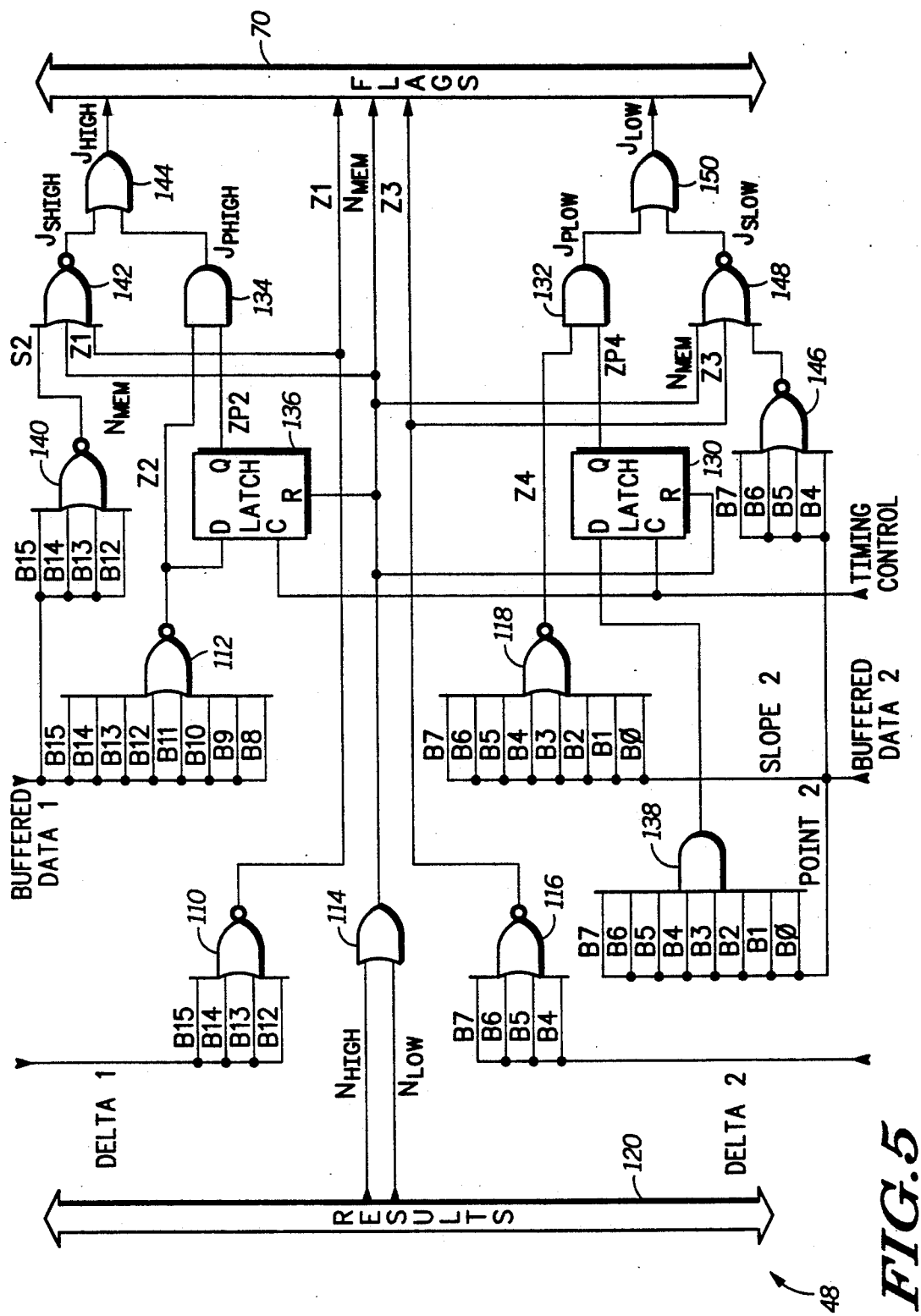
FIG. 5 illustrates in logic circuit form a flag generation logic circuit of FIG. 4.

Flag generation logic circuit 48 is illustrated in greater detail in FIG. 5. Flag generation logic circuit 48 generally includes a NOR gate 110, a NOR gate 112, an OR gate 114, a NOR gate 116, a NOR gate 118, an AND gate 132, an AND gate 134, a latch 136, an AND gate 138, a NOR gate 140, a NOR gate 142, an OR gate 144, a NOR gate 146, a NOR gate 148, and an OR gate 150. Latches 130 and 136 are each implemented as a D flip-flop which has a data input (D), a clock input (C), a reset input (R), and a data output (Q). D flip-flops are well known in the data processing art and, as such, will not be explained in more detail.

Data buffer 42 (FIG. 4) provides bits fifteen through eight of a first information value to NOR gate 112. In the example described herein, the first information value is provided via a first Buffered Data signal, hereafter referred to as a Buffered Data 1 signal. The Buffered Data 1 signal will provide either a Point 1 value or a Slope 1 value. An output of NOR gate 112 is labeled "Z2" and is provided to a data input (D) of latch 136 and a first input of AND gate 134. The Timing Control signal is provided to a clock input (C) of latch 136 by Timing Control bus 38. A data output (Q) of latch 136 is connected to a second input of AND gate 134 to provide a signal labeled "ZP2." An output of AND gate 134 is labeled $J_{Phigh}$ and is provided to a first input of OR gate 144.

Additionally, bits fifteen through twelve (B15 through B12) of the Buffered Data 1 signal are provided to NOR gate 140. An output of NOR gate 140 is labeled "S2" and is provided to a first input of NOR gate 142.

Data buffer 42 also provides bits seven through zero of a second information value to both NOR gate 118 and AND gate 138. The second information value is provided via a second Buffered Data signal, referred to as a Buffered Data 2 signal. The Buffered Data 2 signal provides bits seven through zero of the Point 2 value to AND gate 138 and bits seven through zero of the Slope 2 value to NOR gate 118. AND gate 138 provides an output to a data input (D) of latch 130. NOR gate 118 provides an output labeled "Z4." The Z4 signal is transferred to a first input AND gate 132. The Timing Control signal is provided to a clock input (C) of latch 130 by Timing Control bus 38. A data output (D) of latch 130 is connected to a second input of AND gate 132 to provide a signal labeled "ZP4." An output of AND gate 132 is labeled $J_{Plow}$ and is provided to a first input of OR gate 150.

Additionally, bits seven through four (B7 through B4) of the Buffered Data 2 signal are provided to NOR gate 146. An output of NOR gate 146 is labeled "S4" and is provided to a first input of NOR gate 148.

Delta register 60 provides bits fifteen through twelve of a third information value to NOR gate 110. In this implementation, the third information value is provided by a first Delta signal referred to as a Delta 1 signal. An output of NOR gate 110 is labeled "Z1" and is also transferred via Flags bus 70. The Z1 signal is also provided to a second input of NOR gate 142.

Similarly, delta register 60 provides bits seven through four of a fourth information value to NOR gate 116. An output of NOR gate 116 is labeled "Z3" and is transferred via Flags bus 70. The fourth information value is provided via a second Delta signal referred to as the Delta 2 signal. The Z3 signal is also provided to a second input of NOR gate 148.

Results bus 120 provides a $N_{low}$ and a $N_{high}$ signal to a first and second input of OR gate 114, respectively. An output of OR gate 114 is labeled $N_{mem}$. The $N_{mem}$ signal is provided to a reset input (R) of both latch 130 and latch 136. Additionally, the $N_{mem}$ signal is provided to a third input of each of NOR gate 142 and NOR gate 148.

An output of NOR gate 142 is labeled "$J_{Shigh}$" and is provided to a second input of OR gate 144. An output of OR gate 144 is labeled "$J_{high}$." Additionally, an output of NOR gate 148 is labeled "$J_{Slow}$" and is provided to a second input of OR gate 150. An output of OR gate 150 is labeled "$J_{low}$." The $J_{low}$ and $J_{high}$ signals are communicated via Flags bus 70.

Figure 6:
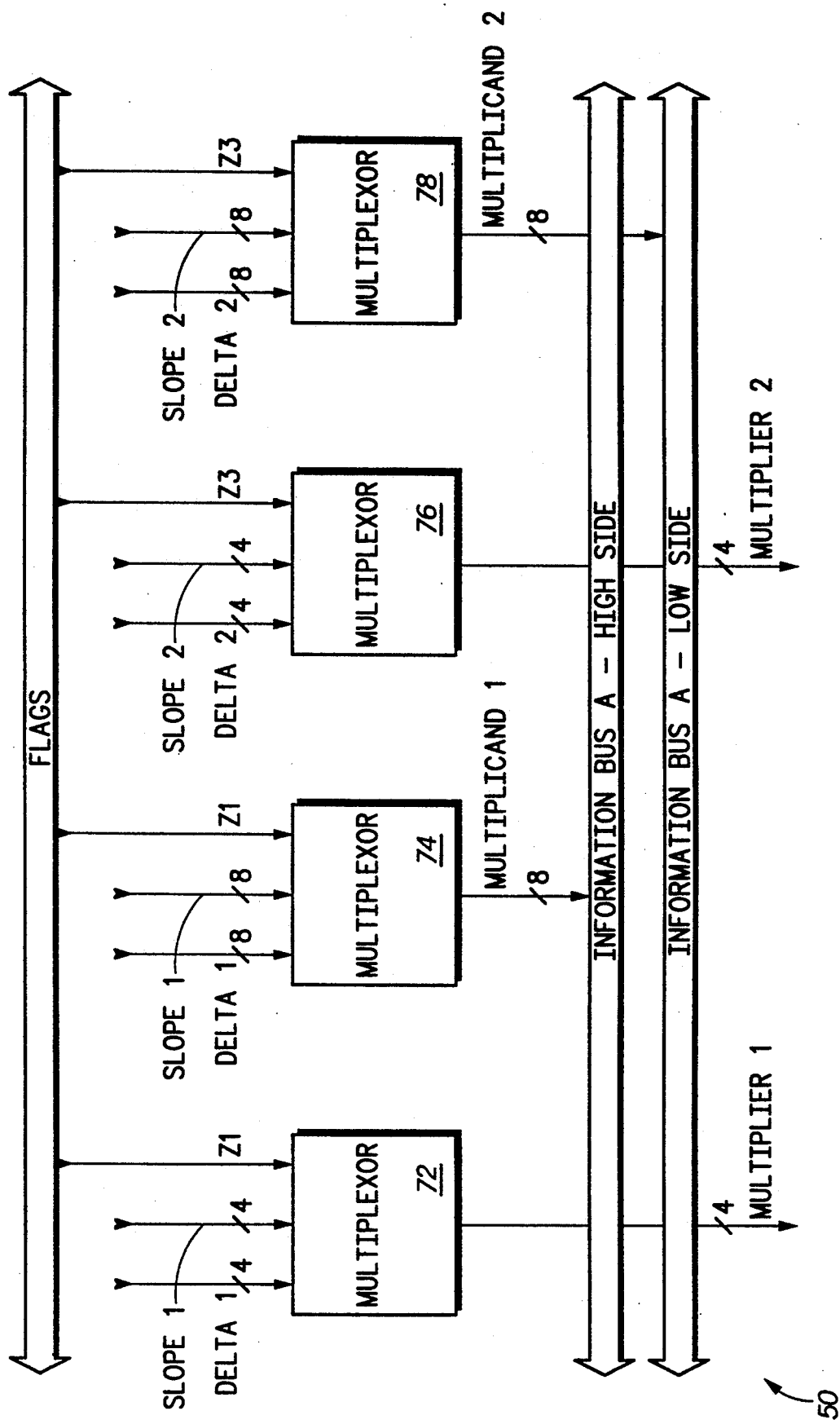
FIG. 6 illustrates in block diagram form an operand assignment logic circuit of FIG. 4.

Operand assignment logic circuit 50 is illustrated in more detail in FIG. 6. Operand assignment logic circuit 50 generally includes a first multiplexor 72, a second multiplexor 74, a third multiplexor 76, and a fourth multiplexor 78.

Delta register 60 and data buffer 42 respectively provide the lower four bits of both the Delta 1 and Slope 1 values to a first and a second input of multiplexor 72. Additionally, delta register 60 and data buffer 42 respectively provide the entire eight bit Delta 1 and Slope 1 values to a first and a second input of multiplexor 74. Similarly, data register 60 and data buffer 42 respectively provide the lower four bits of the Delta 2 and Slope 2 values to a first and a second input of multiplexor 76. Delta register 60 and data buffer 42 respectively provide the entire eight bit Delta 2 and Slope 2 values to a first and a second input of multiplexor 78.

The "Z1" signal is provided to a third input of multiplexor 72 via Flags bus 70. Additionally, the Z1 signal is provided to a third input of multiplexor 74 via Flags bus 70. Similarly, a signal labeled "Z3" is provided to a third input of multiplexor 76 and multiplexor 78, respectively. Again, the Z3 signal is transferred via Flags bus 70.

Multiplexor 72 outputs the four bit Multiplier 1 signal and multiplexor 76 provides the four bit Multiplier 2 signal. Multiplexor 74 outputs an eight bit signal labeled "Multiplicand 1" which is transferred via the high side of Information bus A 66. Multiplexor 78 outputs an eight bit signal labeled "Multiplicand 2" which is transferred via the low side of Information bus A 66.

Figure 7:
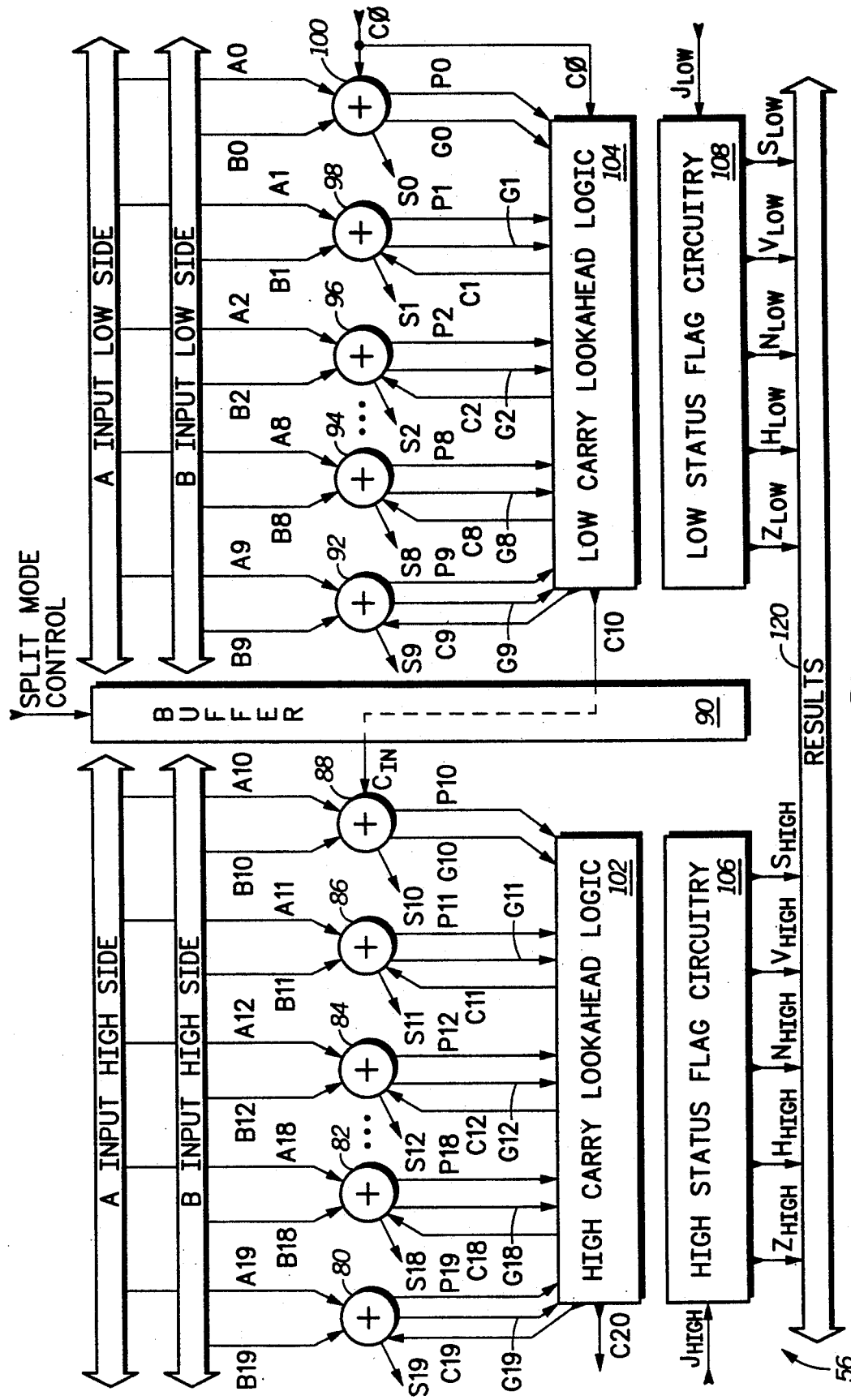
FIG. 7 illustrates in block diagram form an arithmetic logic unit of FIG. 4.

ALU 56 is illustrated in more detail in FIG. 7. ALU 56 generally includes a plurality of adder circuits (80, 82, 84, 86, 88, 92, 94, 96, 98, and 100), a buffer 90, a high carry lookahead logic circuit 102, a low carry lookahead logic circuit 104, a high status flag circuit 106, and a low status flag circuit 108.

The A-input Low Side signal provides a first plurality of bits respectively labeled "a0," "a1," "a2," "a8," and "a9." Bit a0 is input to a first input of adder 100. Similarly, bits a1 through a9 are each provided to a first input of adder 98, adder 96, adder 94, and adder 92 respectively. The B-input Low side signal provides a second plurality of bits respectively labeled "b0," "b1," "b2," "b8," and "b9." Bit b0 is provided to a second input of adder 100. Likewise, bits b1 through b9 are each provided to a second input of adder 98, adder 96, adder 94, and adder 92, respectively. Although not shown in detail in FIG. 7, each of bits a3 through a7 and b3 through b7 are provided to a respective one of a first plurality of adders (not shown). Each of the first plurality of adders (not shown) function the same as adders 92 through 100 and, therefore, are similarly configured.

A signal labeled "C0" is provided to both a first input of low carry lookahead logic 104 and a third input of adder 100. Adder 100 outputs a sum signal labeled "S0." Additionally, adder 100 provides both a propagate signal labeled "P0" and a generate signal labeled "G0" to low carry lookahead logic circuit 104.

A signal labeled "C1" is provided to a third input of adder 98. Adder 98 provides a sum signal labeled "S1." Adder 98 also generates a propagate signal "P1" and a generate signal "G1." Similarly, an signal labeled "C2" is provided to a third input of adder 96. Adder 96 provides a sum output labeled "S2," a propagate signal labeled "P2," and a generate signal labeled "G2." Likewise, signal labeled "C8," is provided to a third input of adder 99. Adder 99 outputs a sum signal labeled "S8," a propagate signal labeled "P8," and a generate signal labeled "G8." A carry signal labeled "C9" provides a third input to adder 92. Adder 92 outputs a sum signal labeled "S9," a propagate signal labeled "P9," and a generate signal labeled "G9." Each of the propagate and generate signals output by adders 92 through 100 are provided to low carry lookahead logic circuit 104.

Low carry lookahead logic circuit 104 provides a carry signal labeled "C10" to buffer 90. The Split Mode Control signal is also provided to buffer 90. Buffer 90 provides a signal labeled "Cin."

The A-input High Side signal provides a first plurality of bits respectively labeled "a10," "a11," "a12," "a18," and "a19." Bit a10 is input to a first input of adder 88. Similarly, bits a11 through through a19 are each provided to a first input of adder 86, adder 84, adder 82, and adder 80, respectively. The B-input High side signal provides a second plurality of bits respectively labeled "b10," "b11," "b12," "b18," and "b19." Bit b10 is provided to a second input of adder 88. Likewise, bits b11 through b19 are each provided to a second input of adder 86, adder 84, adder 82, and adder 80, respectively. Although not shown in detail in FIG. 7, each of bits a13 through a17 and b13 through b17 are provided to a respective one of a second plurality of adders (not shown). Each of the second plurality of adders (not shown) function the same as adders 80 through 88 and, therefore, are similarly configured.

The Cin signal is provided to a third input of adder 88. Adder 88 outputs a sum signal labeled "S10." Additionally, adder 88 provides both a propagate signal labeled "P10" and a generate signal labeled "G10" to high carry lookahead logic circuit 102.

A signal labeled "C11" is provided to a third input of adder 86. Adder 86 provides a sum signal labeled "S11." Adder 86 also generates a propagate signal "P11" and a generate signal "G11." Similarly, a signal labeled "C12" is provided to a third input of adder 84. Adder 84 provides a sum output labeled "S12," a propagate signal labeled "P12," and a generate signal labeled "G12." Likewise, signal labeled "C18" is provided to a third input of adder 82. Adder 82 outputs a sum signal labeled "S18," a propagate signal labeled "P18," and a generate signal labeled "G18." A carry signal labeled "C19" provides a third input to adder 80. Adder 80 outputs a sum signal labeled "S19," a propagate signal labeled "P19," and a generate signal labeled "G19." Each of the propagate and generate signals output by adders 80 through 88 are provided to high carry lookahead logic circuit 102. High carry lookahead logic circuit 102 outputs a carry signal labeled "C20."

Although not shown in FIG. 7, each of the carry, sum, propagate, and generate signals generated by adders 92 through 100 and low carry lookahead logic circuit 104 are also provided to low status flag circuit 108. The $J_{low}$ signal is also provided to low status flag circuit 108. Similarly, each of the carry, sum, propagate, and generate signals formed by adders 80 through 88 and high carry lookahead logic circuit 102 are also provided to high status flag circuit 106. The $J_{Phigh}$ signal is also provided to high status flag circuit 106. Low status flag circuit 108 provides a plurality of signals respectively labeled, "$S_{low}$," "$V_{low}$," "$N_{low}$," "$H_{low}$," and "$Z_{low}$." High status flag circuit 106 provides a plurality of signals respectively labeled, "$S_{high}$," "$V_{high}$," "$N_{high}$," "$H_{high}$," and "$Z_{high}$." Each of the outputs of both low status flag circuit 108 and high status flag circuit 106 are transferred via Results bus 120.

During execution of a fuzzy logic operation, a user of data processing system 10 may use an instruction having a mnemonic form MEM (Membership Evaluation) to perform the fuzzification of system inputs. In the implementation of the invention described herein, the user must store the input to be fuzzified in system input register 64 prior to execution of the MEM instruction. Additionally, the user must also store a pointer in a first index register (not shown) in execution unit 14. The pointer points to a starting address location of the four points necessary to identify the trapezoidal shape of a membership set. As was previously described in FIG. 2, the four points are respectively labeled Point 1, Point 2, Slope 1, and Slope 2. In another form, the user may provide each of these values as operands of the instruction. Such techniques are well known in the data processing art and as such, the implementation will not be discussed in detail herein. The user must also specify a storage location for the fuzzified data after execution of the MEM instruction. In one form, a second index register may be used to point at the storage location for the fuzzified data. Additionally, the system input value should be stored in system input register 64.

Figure 8:
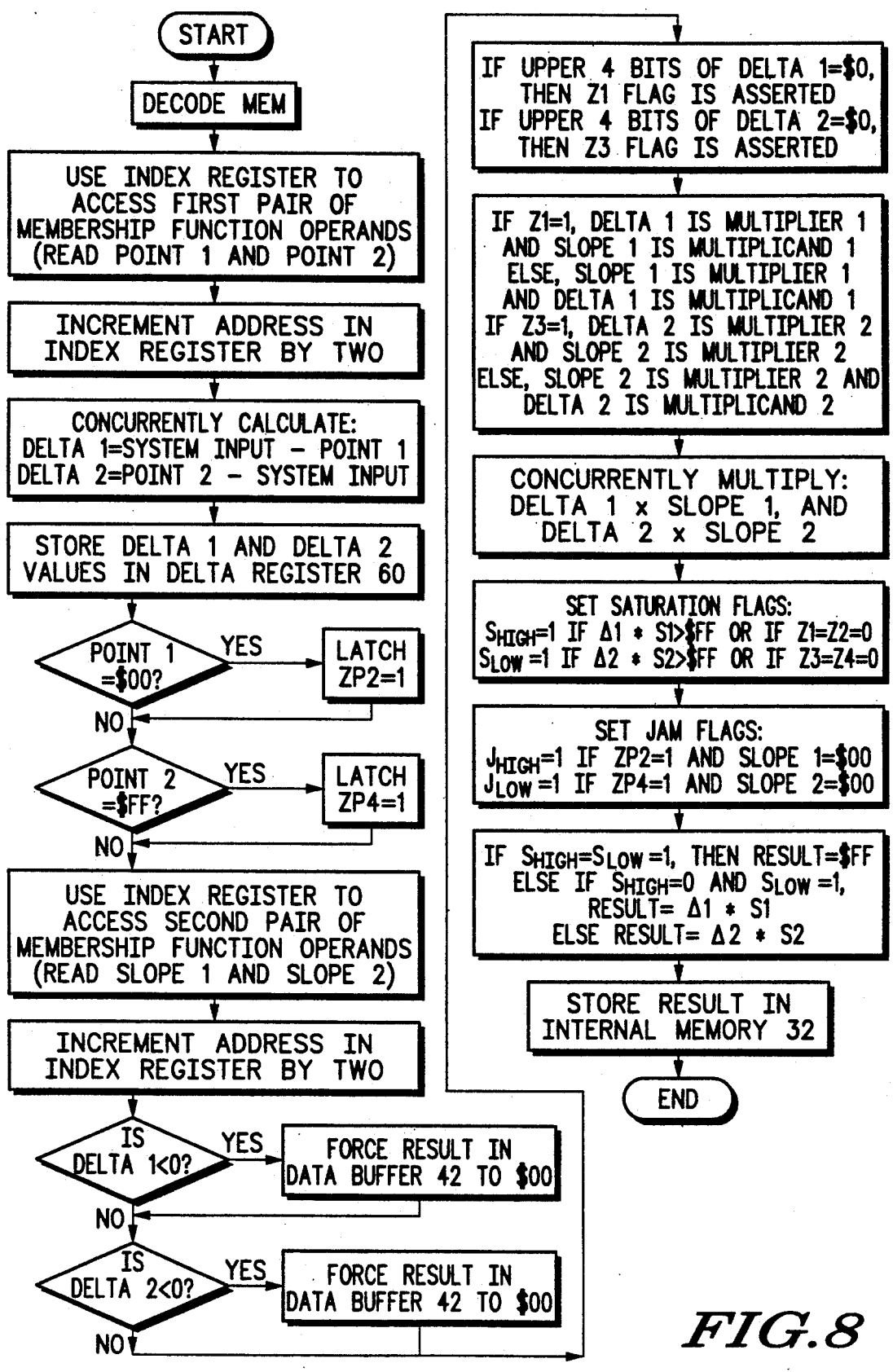
FIG. 8 illustrates in flow chart form a flow of the functions performed during execution of the MEM instruction in accordance with the invention described herein.

In this implementation of the invention, execution of the MEM instruction is performed in accordance with the flow chart illustrated in FIG. 8. The flow chart provides a brief overview of each of the functions performed during execution of the MEM instruction. A more detailed explanation of each of the functions will follow during a course of an example of execution of the MEM instruction.

As illustrated FIG. 8, a first step in execution of the MEM instruction is performed when the MEM instruction is decoded. The address stored in the index register is read and is used to concurrently access the Point 1 and Point 2 values from an address X in internal memory 32. The address is then incremented to point to a next address, X+2.

The Delta 1 and Delta 2 values are then concurrently generated. The Delta 1 value is generated as a result of the subtraction of the Point 1 value from the contents of system input register 64. The Delta 2 value is generated as a result of the subtraction of the contents of system input register 64 from the Point 2 value. Both of the Delta 1 and Delta 2 values are stored in delta register 60.

Next, if the Point 1 value is equal to $00, the ZP2 signal is asserted and latched with a binary value of one. Similarly, if the Point 2 value is equal to $FF, the ZP4 signal is asserted and latched with a binary value of one.

The Slope 1 and the Slope 2 values are then retrieved from address X+2 in internal memory 32 and concurrently stored in data buffer 42. The address is then incremented to point to a next address, X+4.

The Delta 1 and Delta 2 values are tested to determine if either is negative. If either the Delta 1 or Delta 2 value is negative, the system input value is outside the membership set currently being tested. Therefore, the contents of data buffer 42 are cleared to force a degree of membership of $00. Additionally, the ZP2 and ZP4 values respectively stored in latches 136 and 130 are cleared.

Next, the upper four bits of each of the Delta 1 and Delta 2 values are tested to determine if either is equal to a hexadecimal value of $0. If the upper four bits of the Delta 1 value are equal to $0, the Z1 flag is asserted. Similarly, if the upper four bits of the Delta 2 value are equal to $0, the Z3 flag is asserted.

If the Z1 flag is asserted, the Delta 1 value is the Multiplier 1 value and the Slope 1 value is the Multiplicand 1 value. Otherwise, the Slope 1 value is the Multiplier 1 value and the Delta 1 value is the Multiplicand 1 value. If the Z3 flag is asserted, the Delta 2 value is the Multiplier 2 value and the Slope 2 value is the Multiplicand 2 value. Otherwise, the Slope 2 value is the Multiplier 2 value and the Delta 2 value is the Multiplicand 1 value.

The product of the Delta 1 value and the Slope 1 value is generated next. Additionally, the product of the Delta 2 value and the Slope 2 value is generated concurrently in two concurrent multiplication operations.

The high saturation flag ($S_{high}$) is then asserted if the product of the Delta 1 value and the Slope 1 value is greater than $FF. Additionally, the $S_{high}$ signal is asserted if the $J_{high}$ signal is asserted. $J_{high}$ is asserted if neither the Slope 1 or Delta 1 values has a hexadecimal value of $0 in its upper four bits. $J_{high}$ is also asserted in the special case where the Point 1 and Slope 1 values have a hexadecimal value of $00. If the Point 1 value is equal to $00, the ZP2 signal is asserted and if the Slope 1 value is equal to $00, the Z2 signal is asserted.

Similarly, the low saturation flag ($S_{low}$) is asserted if the product of the Delta 2 value and the Slope 2 value is greater than $FF. Additionally, the $S_{low}$ signal is asserted if the $J_{low}$ signal is asserted. $J_{low}$ is asserted if neither the Slope 2 or Delta 2 values has a hexadecimal value of $0 in its upper four bits. Additionally, the Z1 and Z2 signals must be negated. $J_{low}$ is also asserted in the special case where the Point 2 value has a hexadecimal value of $FF and the Slope 2 value has a hexadecimal value of $00. If the Point 2 value is equal to $FF, the ZP4 signal is asserted and if the Slope 2 value is equal to $00, the Z4 signal is asserted.

If both the $S_{high}$ and $S_{low}$ signals are asserted, a degree of membership of the system input is $FF. If $S_{high}$ is negated and $S_{low}$ is asserted, the degree of membership of the system input is equal to the product of the Delta 1 value and the Slope 1 value. Otherwise, the degree of membership is equal to the product of the Delta 2 and the Slope 2 values.

The degree of membership is then provided to the address in internal memory 32 specified by the user and execution of the MEM instruction is terminated.

The flow chart illustrated in FIG. 8 provides an overview of execution of the MEM instruction in data processing system 10. A more detailed example will now be given.

During operation, a user may provide the MEM instruction to data processing system 10 through a software program stored either externally or in internal memory 32. Should the MEM instruction be provided by a source external to data processing system 10, the MEM instruction would be input via External Data bus 33 to external bus interface 30. External bus interface 30 would subsequently provide the MEM instruction to CPU 12 via Internal Data bus 34. If the MEM instruction was provided by a software program in internal memory 32, the MEM instruction would be provided to CPU 12 via Internal Data bus 34. In CPU 12, execution unit 14 would provide the MEM instruction to instruction decode logic circuit 18 in response to control signals received from each of bus control logic circuit 16, control unit 20, and sequencer 22. Instruction decode logic circuit 18 subsequently decodes the MEM instruction to provide a plurality of control and information signals necessary for the proper execution of the MEM instruction.

Upon receipt and decoding of the MEM instruction, execution unit 14 begins the steps necessary to fuzzify a system input. As was previously described, a system input designating a value which is to be fuzzified is stored in system input register 64 by the user of data processing system 10 prior to execution of the MEM instruction.

In addition to the system input value, the user of data processing system 10 is also required to input the four values which define each membership set in the particular implementation of the fuzzy logic operation. For example in FIG. 1, if temperature was being fuzzified, five membership sets would need to be defined. Therefore, a total of twenty values would be required to adequately distinguish each membership set in the entire system. As was previously stated and illustrated in FIG. 2, the values required to identify a single membership set are a Point 1, a Point 2, a Slope 1, and a Slope 2. Each of these points is represented by an eight bit binary value.

During a fuzzification operation, each of the membership sets must be evaluated with respect to the system input value. In the case of the fuzzy logic system shown in FIG. 1, five membership set evaluations occur for the system input temperature. Therefore, it is important to minimize the amount of time necessary to determine a degree of membership in each membership set.

The pointer in the index register points to an address of the Point 1 value in internal memory 32. When accessed from internal memory 32, the Point 1 value is provided to data buffer 42 via External Information bus 40. Data buffer 40 passes the Point 1 value to A-Input multiplexor 54 via Information Bus A 66. A-Input multiplexor 54 subsequently provides the Point 1 value to ALU 56 where it is subtracted from the system input value to provide the Delta 1 value. The Delta 1 value is provided to delta register 60 via Information bus B 68. Additionally, data buffer 42 provides the Point 1 value to flag generation logic circuit 48 via the Buffered Data 1 signal. In flag generation logic circuit 48 of FIG. 5, each bit of the Point 1 value is provided to an input of NOR gate 112. A result of the NOR operation, the Z2 signal, is stored in latch 136 at a point in time determined in accordance with the Timing Control signal.

In this implementation of the invention, the Point 1 and Point 2 values are accessed concurrently from internal memory 32. Both values are transferred to data buffer 42 via External Information bus 40. Data buffer 40 passes the Point 2 value to B-Input multiplexor 58 via Information Bus B 68. B-Input multiplexor 58 subsequently provides the Point 2 value to ALU 56 where the system input value is subtracted to provide a Delta 2 value. Information bus B 68 provides the Delta 2 value to delta register 60. Additionally, data buffer 42 provides the Point 2 value to flag generation logic circuit 48 via the Buffered Data 2 signal. In flag generation logic circuit 48 of FIG. 5, each bit of the Point 2 value is provided to an input of AND gate 138. A result of the AND operation is stored in latch 130 at a point in time determined in accordance with the Timing Control signal. The AND operation detects whether or not Point 2 value is equal to $FF.

ALU 56 executes each of the subtraction operations described above such that the Delta 1 and Delta 2 values are calculated concurrently. ALU 56 performs sixteen bit arithmetic operations when in a normal mode of operation. Additionally, ALU 56 is able to execute two independent eight bit calculations concurrently when in a split mode of operation. Because two eight bit calculations are performed concurrently, no cycles are wasted as would be the case for an ALU which performed only sixteen bit operations. Therefore, ALU 56 greatly increases both the speed and efficiency of execution unit 14 when performing eight bit arithmetic. Operation of ALU 56 will be subsequently discussed in more detail.

The pointer in the index register subsequently points to an address of the Slope 1 value in internal memory 32. Internal memory 32 provides the eight bit Slope 1 value and the eight bit Slope 2 value to data buffer 42 via External Information bus 40. Data Buffer 42 passes both of the slope values to flag generation logic 48 via the sixteen bit Buffered Data signal.

Upon calculation of the Delta 1 and Delta 2 values and receipt of the Slope 1 and Slope 2 values, flag generation logic circuit 48 is enabled to generate a plurality of flags necessary for determining a degree of membership in the membership set currently being tested. As shown in FIG. 5, the upper four bits of the Delta 1, Delta 2, Slope 1, and Slope 2 values are respectively provided to NOR gate 110, NOR gate 116, NOR gate 140, and NOR gate 146.

NOR gate 140 generates the S2 signal and NOR gate 146 generates the S4 signal. The S2 signal is asserted when the upper four bits of the Slope 1 value have a hexadecimal value of $0. Similarly, the S4 signal is asserted when the upper four bits of the Slope 2 value have a hexadecimal value of $0.

In flag generation logic 48, the Slope 1 and Slope 2 values are respectively provided to NOR gate 112 and NOR gate 118 by the Buffered Data signal. The Z2 flag is asserted when the Slope 1 value equals hexadecimal $00. The Z2 flag generated by NOR gate 112 is provided to the data input of latch 136 and AND gate 134. The Z2 flag is latched in latch 136 when the Timing Control signal has a first predetermined logic value. Additionally, when the Timing Control signal has a second predetermined logic value, latch 136 provides the previously latched ZP2 signal to AND gate 134. AND gate 134 is used to generate the $J_{Phigh}$ signal.

The Z4 flag is asserted when the Slope 2 value equals hexadecimal $00. The Z4 flag generated by NOR gate 118 is provided to AND gate 132. An output of AND gate 138 is provided to the data input of latch 130. The output of AND gate 138 is latched in latch 130 when the Timing Control signal has a first predetermined logic value. Additionally, when the Timing Control signal has a second predetermined logic value, latch 130 provides the previously latched ZP4 signal to AND gate 132. AND gate 132 is used to generate the $J_{Plow}$ signal.

The Z1 flag signal is asserted only if each of the upper four bits of the Delta 1 value is negated. Similarly, the Z3 flag signal is only asserted when the upper four bits of the Delta 2 value has a hexadecimal value of $0. Each of the flags, Z1 and Z3, is subsequently used during an operand assignment step which will be discussed in further detail later.

In addition to the Delta 1 and Delta 2 values, Results bus 120 also transfers the $N_{high}$ and $N_{low}$ signals to OR gate 114 to generate the $N_{mem}$ signal. The $N_{low}$ signal is asserted if the Delta 2 value provided by ALU 56 is less than zero. Similarly, the $N_{high}$ signal is asserted if the Delta 1 value provided by ALU 56 is less than zero. As was previously described, if either the Delta, 1 or Delta 2 values is less than zero, the system input is not a member of the membership set being examined.

Therefore, when the $N_{mem}$ signal is asserted, the system input has a degree of membership of zero in the membership set currently being tested. Subsequently, the $N_{mem}$ signal is provided to A-Input control logic 52. When asserted, the $N_{mem}$ signal enables A-Input control logic 52 to assert the A-Control signal such that A-Input multiplexor 52 provides a hexadecimal value of $00 to ALU 56. Subsequently, ALU 56 provides a value of $00 to data buffer 42 via Information Bus B 68.

Additionally, when the Nmem signal is asserted, latch 130 is reset such that the ZP4 signal is negated. Therefore, the $J_{Plow}$ signal may not be erroneously asserted. Similarly, latch 136 is reset such that the ZP2 signal is negated. Therefore, the $J_{Phigh}$ signal may not be erroneously asserted.

The $N_{mem}$ signal, the Si signal, and the Z1 signal are each provided to NOR gate 142 to generate the $J_{Shigh}$ signal. The $J_{Shigh}$ and $J_{Phigh}$ signals are then "OR'ed" to provide the $J_{high}$ signal.

The $J_{Phigh}$ signal is provided to indicate a special case in which both the Point 1 value and the Slope 1 value have a hexadecimal value of $00. Such a case would occur if a membership set is a partial trapezoid located such that the degree of membership has a value of $FF at the Point 1 boundary value. The cold temperature membership function shown in FIG. 1 is an example of this special case. The $J_{high}$ signal is provided to ALU 56 to force the saturation flag, $S_{high}$, to be asserted when the input value falls within the membership set being evaluated. The $J_{high}$ signal is also asserted if the Z1, S2, and $N_{mem}$ signals are all negated. This corresponds to the case in which neither the Delta 1 nor Slope 1 values is $0F or less, and the current input is within the membership set.

The $N_{mem}$ signal, the S4 signal, and the Z3 signal are each provided to NOR gate 148 to generate the $J_{Slow}$ signal. The $J_{Slow}$ and $J_{Plow}$ signals are then "OR'ed" to provide the $J_{low}$ signal.

The $J_{low}$ signal is provided to indicate a special case in which the Point 2 value has a hexadecimal value of $FF and the Slope 2 value has a hexadecimal value of $00. Such a case would occur if a membership set is a partial trapezoid located such that the degree of membership ends at $FF at the Point 2 boundary value. The hot temperature membership function shown in FIG. 1 is an example of this special case. The $J_{low}$ signal is provided to ALU 56 to force the saturation flag, $S_{low}$, to be asserted when the input value falls within the membership set currently being evaluated. The $J_{low}$ signal is also asserted if the Z3, S4, and $N_{mem}$ signals are all negated. This corresponds to the case in which neither the Delta 2 nor Slope 2 values is $0F or less, and the current input is within the membership set.

However, if the system input value is in a membership set currently being examined, the $N_{mem}$ signal is negated and the Z1 and Z3 flag signals are provided to both operand assignment logic 50 and result select logic 46 to determine a degree of membership in the membership set.

Degree of membership in a membership set is determined by obtaining the minimum value of either a saturation point in the trapezoid defining the membership set, a product of Delta 1 and Slope 1, or a product of Delta 2 and Slope 2. In the example shown in FIG. 2, the saturation point would have a hexadecimal value of $FF, which is interpreted as a fraction of 0.996.

To calculate the products of both Delta 1 and Slope 1, and Delta 2 and Slope 2, a method has been developed to ensure fast multiplication operations. As is commonly known in the art, a multiply operation is completed more quickly when a multiplier is smaller than a multiplicand. If, as in this example, the saturation value of the membership set is $FF, mathematical analysis indicates that at least one of either the delta or slope terms forming the product must be less than or equal to $0F. However, one exception to this case occurs when the current system input value is outside the membership set or in the saturation region of the membership set.

By testing the four upper order bits of each of the delta and slope values, the first term which has a hexadecimal value of $0F or less may be used as the multiplier. Therefore, the time necessary to complete the multiplication operation is shortened. If both the Delta 1 and Slope 1 values have a hexadecimal value greater than $0F, the $J_{high}$ signal forces the Shigh saturation flag to be asserted. Similarly, if both the Delta 2 and Slope 2 values have a hexadecimal value greater than $0F, the $J_{low}$ signal forces the $S_{low}$ saturation flag to be asserted.

The Z1 flag signal is used to indicate whether or not the Delta 1 or Slope 1 value should be provided as the four bit Multiplier 1 signal. Similarly, the Z3 flag signal is used to indicate whether or not the Delta 2 or Slope 2 value should be provided as the four bit Multiplier 2 signal. Operated assignment logic 50 illustrated in FIG. 6 provides one implementation for determining the value of the multiplier for each of the two multiplication operations to be performed.

As illustrated in FIG. 6, multiplexor 72 determines whether Delta 1 or Slope 1 values should be assigned to the 4-bit Multiplier 1 signal. If the Z1 flag signal is asserted, then the Delta 1 value is transferred via the four bit Multiplier 1 signal. If the Z1 signal was not asserted, then the four bit Multiplier 1 signal would be assigned the Slope 1 value. Additionally, if the Z1 signal is asserted, multiplexor 74 provides the Slope 1 value to $A_{high}$ as the eight bit Multiplicand 1 signal. If the Z1 signal is negated, the Delta 1 value is assigned to the eight bit Multiplicand 1 signal.

Similarly, multiplexor 76 determines whether the Delta 2 or Slope 2 values are to be assigned to the Multiplier 2 signal based on a value of the Z3 flag signal. If the Z3 flag signal is asserted, multiplexor 76 provides the Delta 2 signal as the Multiplier 2 signal. If the Z3 signal was not asserted, then the 4-bit Multiplier 2 signal would be assigned the Slope 2 value. Additionally, if the Z3 flag signal is asserted, multiplexor 78 provides the Slope 2 signal as the Multiplicand 2 signal. If the Z3 signal is negated, the Delta 2 value is assigned to the 8-bit Multiplicand 1 signal.

The Multiplier 1 and Multiplier 2 signals are transferred from operand assignment logic 50 to A-input control logic circuit 52. A-input control logic circuit 52 processes each of the Multiplier 1 and Multiplier 2 signals to provide the A-Control signal determining a specific shift operation of A-input multiplexor 54.

During operation, the Multiplier 1 signal, which is either the Delta 1 or Slope 1 value, is provided to A-Input control logic 52 to determine whether the Multiplicand 1 signal should be shifted by either zero, one, or two to perform a first multiplication operation. Additionally, A-Input control logic 52 may negate or zero the Multiplicand 1 signal. The A-Control signal is provided to A-input multiplexor 54 to indicate a type of operation to be performed. The Multiplicand 1 signal is transferred to A-input multiplexor 54 via the high side of Information Bus A 66. A-Input control logic 52 modifies the Multiplicand 1 signal in accordance with the A-Control signal and provides the modified Multiplicand 1 signal to ALU 56. Similarly, the Multiplier 2 signal, which is either the Delta 2 or Slope 2 value, is also provided to A-Input control logic 52. The Multiplier 2 signal is used to shift the Multiplicand 2 signal by either zero, one, or two to concurrently perform a second multiplication operation. Additionally, A-Input control logic 52 may negate or zero the Multiplicand 2 signal. The Multiplier 2 signal is transferred to A-input multiplexor 54 via the low side of Information Bus A 66. A-Input control logic 52 modifies the Multiplicand 2 signal in accordance with the A-Control signal, and subsequently provides the modified Multiplicand 2 signal to ALU 56.

Control of B-input multiplexor 58 is provided by external Micro-ROM control signals generated during decoding of the MEM instruction and transferred via Micro-ROM Control bus 65. Generation, routing, and use of such Micro-ROM control signals is well known in the data processing art and, as such, will not be discussed in detail herein. In the example described herein, an initialized partial product of $00 is provided to ALU 56 via B-input multiplexor 58.

Upon receipt of the appropriate A-Control signal from A-input control logic circuit 52, A-input multiplexor 54 provides the modified Multiplicand 1 and the modified Multiplicand 2 signals to a high and a low side of ALU 56, respectively. B-input multiplexor 58 concurrently provides the initialized partial product to the high and low sides of ALU 56, respectively.

ALU 56 is illustrated in more detail in FIG. 7. During operation, the modified Multiplicand 2 signal is provided to a respective one of adders 92 through 100. Bit nine of the modified Multiplicand 2 signal, labeled "a9," is connected to a first input of adder 92. Similarly, bits eight through zero of the modified Multiplicand 2 signal are connected to first inputs of adders 94, 96, 98, and 100, respectively. Bit nine of the initialized partial product, labeled "b9," is connected to a second input of adder 92. Bits eight through zero of the initialized partial product are also each connected to second inputs of adders 94, 96, 98, and 100, respectively.

The carry signal labeled "C0" is provided to third input of adder 100. The C0 signal is generally provided by a source external to ALU 56 in response to an operation being executed and a value of the Multiplier 2 signal. Based on each of the three input signals, adder 100 provides three output signals. A first output signal, the S0 signal is equal to:

$$S0 = a0 \oplus b0 \oplus c0. \qquad (1)$$

A second output signal is the generate, or G0 signal, which is equal to:

$$G0 = a0 \cdot b0. \qquad (2)$$

A third output signal is the propagate, or P0 signal, which is equal to:

$$P0 = a0 + b0. \qquad (3)$$

In response to both the G0 and P0 signals, low carry lookahead logic circuit 104 generates a C1 signal which is provided to a third input of adder 98. The C1 signal is expressed as:

$$C1 = G0 + P0 \cdot C0. \qquad (4)$$

In response to each of the a1, b1, and C1 signals, adder 98 provides a generate signal labeled "G1" and a propagate signal labeled "P1" to low carry lookahead logic circuit 104.

In response to the G1, P1, and C1 signals, low carry lookahead logic circuit 104 generates a C2 signal which is provided to a third input of adder 96. The C2 signal is computed by the following equation:

$$C2 = G1 + P1(G0 + P0)C0$$

Adder 96 then provides a generate signal labeled "G2" and a propagate signal labeled "P2" to low carry lookahead logic circuit 104.

Subsequently, low carry lookahead logic circuit 104 generates a carry signal which is provided to a third input of each of the remaining adders (94, 92) on the low side of ALU 56. Each of the remaining carry signals is calculated as the sum of the previous generate term and the product of the previous propagate and carry terms. Although not illustrated herein, additional adders are used to calculate the sum of bits three through seven of the values provided by both A-Input low side and B-Input low side.

Upon receipt of the propagate and generate terms from the last adder, adder 92, low carry lookahead logic circuit 104 provides a carry signal labeled "C10." The C10 signal is provided to buffer 90. In response to the Split Mode Control signal, buffer 90 either forwards the C10 carry signal to a next adder in the high side of ALU 56, or provides another carry value which is generated therein. The Split Mode Control signal is provided by a source external to execution unit 14. For example, during execution of the MEM instruction, the Split Mode Control signal is generated during the decoding of the instruction. Additionally, the Split Mode Control signal might be provided by a source other than an instruction which is specified by the user of data processing system 10.

If the C10 carry signal is forwarded to adder 88 as the Cin carry signal, ALU 56 operates as a typical sixteen-bit arithmetic logic unit which is well known in the art. However, if the Cin carry signal is provided by a source other than low carry lookahead logic circuit 104, ALU 56 is operating in a split mode of operation. In the split mode of operation, ALU 56 may concurrently provide two eight bit results which are not related. During execution of the MEM instruction, ALU 56 operates in the split mode of operation to concurrently provide both the product of the Delta 1 and Slope 1 signals and the product of the Delta 2 and Slope 2 signals. Additionally, ALU 56 also calculated the Delta 1 and Delta 2 values concurrently while operating in split mode. Therefore, by operating in the split mode of operation, ALU 56 is able to provide results of eight bit operations more quickly and efficiently.

Additionally, in ALU 56, the low status flag circuit 108 provides status information about operation of the low side of ALU 56. Low status flag circuit 108 provides a plurality of status signals, $S_{low}$, $V_{low}$, $N_{low}$, $H_{low}$, and $Z_{low}$ each of which is transferred via Results bus 120. Although not shown herein, each of the outputs of adders 92 through 100 are provided to low status flag circuit 108. Such routing is commonly known in the data processing art and should be easily implemented by one with ordinary skill in the art. Each of the status signals is determined by combining the plurality of sum and carry signals generated by the low side of ALU 56.

In the implementation of the invention described herein, the $S_{low}$ signal is expressed by the following equation:

$$S_{low} = S9 + S8 + J_{low}. \qquad (6)$$

The $V_{low}$, $N_{low}$, $H_{low}$, and $Z_{low}$ signals may be respectively expressed as follows:

$$V_{low} = C6 \oplus C7, \qquad (7)$$

$$N_{low} = S8, \qquad (8)$$

$$H_{low} = C3, \text{ and} \qquad (9)$$

$$Z_{low} = \overline{S_7 + S_6 + S_5 + \ldots + S_0} \qquad (10)$$

Additionally, the sum signal output by each of adders 92 through 100 is transferred from ALU 56 via Results bus 120. Each of the sum signals output by adders 92 through 100 represents a respective bit of the product of the Multiplier 2 and Multiplicand 2 signals. In turn, the product of the Multiplier 2 and Multiplicand 2 signals is equal to the product of the Delta 2 and Slope 2 signals.

During operation, the high order side of ALU 106 functions similarly to the low order side. The carry signal labeled "Cin" is provided to third input of adder 88. As was previously mentioned, the Cin signal may either be provided by a source external to ALU 106 or by the C10 carry signal from low carry lookahead logic circuit 104. Based on each of the three input signals, adder 88 provides three output signals. A first output signal, the S10 signal is equal to:

$$S10 = a10 \oplus b10 \oplus Cin. \quad (11)$$

A second output signal is the generate, or C10 signal, which is equal to:

$$G10 = a10 \cdot b10. \quad (12)$$

A third output signal is the propagate, or P10 signal, which is equal to:

$$P10 = a10 + b10. \quad (13)$$

In response to both the G10 and P10 signals, high carry lookahead logic circuit 102 generates a C11 signal which is provided to a third input of adder 86. The C11 signal is expressed as:

$$C11 = G10 + P10 \cdot C10. \quad (14)$$

In response to each of the a11, b11, and C11 signals, adder 86 provides a generate signal labeled "G11" and a propagate signal labeled "P11" to high carry lookahead logic circuit 102.

In response to the G11, P11, and C11 signals, high carry lookahead logic circuit 102 generates a C12 signal which is provided to a third input of adder 84. The C12 signal is computed by the following equation:

$$C12 = G11 + P11(G10 + P10)C10 \quad (15)$$

Adder 84 then provides a generate signal labeled "G12" and a propagate signal labeled "P12" to high carry lookahead logic circuit 102.

Subsequently, high carry lookahead logic circuit 102 generates a carry signal which is provided to a third input of each of the remaining adders (80, 82) on the high side of ALU 56. Each of the remaining carry signals is calculated as the sum of the previous generate term and the product of the previous propagate and carry terms. Although not illustrated herein, additional adders are used to calculate the sum of bits thirteen through seventeen of the values provided by both A-Input high side and B-Input high side.

Upon receipt of the propagate and generate terms from the last adder, adder 80, high carry lookahead logic circuit 102 provides a carry signal labeled "C20". The C20 signal is output from ALU 56 via Results bus 120 for use in subsequent operations.

Additionally, in ALU 56, the high status flag circuit 106 provides status information about operation of the high side of ALU 56. High status flag circuit 106 provides a plurality of status signals, $S_{high}$, $V_{high}$, $H_{high}$, and $Z_{high}$, each of which is transferred via Results bus 120. Each of the outputs of adders 80 through 88 is provided to high status flag circuit 106. Again, such routing is commonly known in the data processing art and should be easily implemented by one with ordinary skill in the art. Each of the status signals is determined by combining the plurality of sum and carry signals generated by the high side of ALU 56.

In the implementation of the invention described herein, the $S_{high}$ signal is expressed by the following equation:

$$S_{high} = S19 + S18 + J_{high}. \quad (16)$$

The $V_{high}$, $N_{high}$, and $H_{high}$ signals may be respectively expressed as following:

$$V_{high} = C16 \oplus C17, \quad (17)$$

$$N_{high} = S18, \quad (18)$$

$$H_{high} = C13, \text{ and} \quad (19)$$

$$Z_{high} = \overline{S19 + S18 + S17 + \ldots + S10} \quad (20)$$

Additionally, the sum signal output by each of adders 80 through 88 is transferred from ALU 56 via Results bus 120. Each of the sum signals output by adders 80 through 88 represents a respective bit of the product of the Multiplier 1 and Multiplicand 1 signals. In turn, the product of the Multiplier 1 and Multiplicand 1 signals is equal to the product of the Delta 1 and Slope 1 signals.

Each of the status bits from the high and low sides of ALU 56 are subsequently provided to result select logic 46. Result select logic 46 subsequently uses each of the $S_{low}$ and $S_{high}$ signals to determine whether the product of the Delta 1 and Slope 1 signals, the product of the Delta 2 and Slope 2 signals, or a saturation value of $FF should be provided as a degree of membership in the membership set being examined.

In all cases where the system input value falls within the membership set trapezoid, either $S_{high}$ will be asserted, $S_{low}$ will be asserted, or both $S_{high}$ and $S_{low}$ will be asserted. If both the $S_{low}$ and $S_{high}$ signals are asserted, the system input is a member of the membership set being examined with a degree of membership of the saturation point ($FF, in this example). Therefore, when both the $S_{low}$ and $S_{high}$ signals are asserted, result select logic circuit 46 asserts the Force $FF signal to force the contents of data buffer 42 to be $FF indicating that the system input is a member of the membership set and has a degree of membership of $FF.

If the $S_{low}$ signal is asserted, but the $S_{high}$ signal is negated, result select logic circuit 46 asserts the Select signal to store the product of the Delta 1 and Slope 1 signals in data buffer 42. Similarly, if the $S_{low}$ signal is negated, but the $S_{high}$ signal is asserted, result select logic circuit negates the Select signal to store the product of the Delta 2 and Slope 2 signals in data buffer 42.

If both $S_{high}$ and $A_{low}$ are negated, the system input value is not within the membership set trapezoid defined by the boundary values. In all cases in which the system input value falls outside of the membership set trapezoid, the $N_{mem}$ signal will be asserted. The $N_{mem}$ signal, in turn, causes A-input control logic 52 to select zeroes to be input to ALU 56 during the multiply operations. Result select logic circuit 46 negates both the Force $FF signal and the Select signal and a hexadecimal value of $00 stored in data buffer 42. Result select logic circuit 46, therefore, determines a value of the result of the MEM degree of membership calculation and provides that result to data buffer 42. When requested by a source external to execution unit 14, data buffer 42 provides the result via External Information Bus 40.

There has been provided herein a circuit and a method for determining a degree of membership in a membership set using a single software instruction. In the example described herein, the software instruction is the MEM instruction. When programmed with the MEM instruction, data processing system 10 is able to determine a degree of membership in a membership set with a single software instruction which may be performed very quickly. Previous implementations have required excessive amounts of software code which typically require substantially more time to execute. In a typical software program which implements a degree of membership calculation, the MEM instruction would alleviate a significant number of software instructions. For example, a software program implemented using the MC68HC11 instruction set typically requires thirty-one instructions to perform a degree of membership calculation. The MEM instruction replaces all thirty-one instructions of the MC68HC11 program. Additionally, the MEM instruction provides a result up to seventy-one cycles faster than previous software implementations of degree of membership calculations.

The MEM instruction is able to accomplish a degree of membership calculation more quickly and efficiently because it is a member of an instruction set of data processing system 1. It is well known that an instruction which is a member of the instruction set will be executed more quickly than an external routine which programs the data processing system 10 to emulate the instruction. Additionally, the function performed by operand assignment logic circuit 50 also serves to enhance performance of data processing system 10 which implements the MEM instruction. Operand assignment logic circuit 50 recognizes that at least one of either the multipliers or multiplicands used during calculation of degree of membership must have a hexadecimal value of $0 in the upper four bits. Therefore, by making the value which has the $0 in the upper four bits, the multiplier, the multiplication operations will be significantly shortened and completed in a more timely manner.

Additionally, by operating ALU 56 in split mode in which two eight bit results may be concurrently produced, further time is saved. ALU 56 provides a unique circuit which may be used to produce two eight bit results when in a split mode of operation, and a sixteen bit result when not in a split mode of operation. Due to the nature of the example described herein, only eight bit results are produced during subtraction and multiplication of the delta values and the slope values. Therefore, ALU 56 may be operated in split mode during execution of the MEM instruction and two subtraction or multiplication operations may be concurrently performed. Therefore, the time typically necessary to perform these operations is effectively halved during split mode operation.

The implementation of the invention described herein is provided by way of example only. However, many other implementations may exist for executing the function described herein. For example, the points necessary to define the membership set may be provided by a user of data processing system 10 as operands of the MEM instruction, rather than as previously stored data values in memory. Additionally, ALU 56 may be implemented such that thirty-two bit results may be obtained. In the case of either a multiplication or substraction operation, each of the low and high sides would produce a sixteen bit result during a split mode of operation.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A method for performing a fuzzy logic operation in a data processing system, the fuzzy logic operation determining membership of an input value in a predetermined membership set which is defined by a plurality of boundary values, the method comprising the steps of:

inputting a membership evaluation instruction to a decoder in the data processing system, initiating execution of the fuzzy logic operation in the data procesisng system based on the membership evaluation instruction being;

decoding the membership evaluation instruction to provide a plurality of control signals, the membership evaluation instruction being decoded by the decoder;

subtracting a first one of the plurality of boundary values from the input value to produce a first delta value in response to a first one of the plurality of control signals, an arithmetic logic means being coupled to the decoder for receiving the first one of the plurality of control signals, the arithmetic logic means being used to substract the first one of the plurality of boundary values from the input value;

concurrently substracting the input value from a second one of the plurality of boundary values to produce a second delta value in response to a second one of the plurality of control signals, the arithmetic logic means being coupled to the decoder for receiving the second one of the plurality of control signals, the arithmetic logic means being used to subtract the input value from the second one of the plurality of boundary values;

multiplying the first delta value and a third one of the plurality of boundary values to provide a first result in response to a third one of the plurality of control signals, the arithmetic logic means being coupled to the decoder for receiving the third one of the plurality of control signals, the arithmetic logic means multiplying the first delta value and the third one of the plurality of boundary values;

concurrently multiplying the second delta value and a fourth one of the plurality of boundary values to provide a second result in response to a fourth one of the plurality of control signals, the arithmetic logic means being coupled to the decoder for receiving the fourth one of the plurality of control signals, the arithmetic logic means multiplying the second delta value and the fourth one of the plurality of boundary values; and inputting a degree of membership signal using a select logic means, the degree of membership signal indicating that the input value is not included in the predetermined membership set when one of the first delta value and the second delta value is less than zero, the degree of membership signal being equal to a minimum value of one of the first result, the second result, and a fifth one of the plurality of boundary values if neither the first delta value nor the second delta value is less than zero, the select logic means being coupled to the arithmetic logic means for receiving the first delta value, the second delta value, the first result, and the second result.

2. The method of claim 1 further comprising the steps of:

generating a first flag signal to indicate a value of a predetermined portion of the first delta value, a flag generation logic means being coupled to the arithmetic logic means to receive the first delta value and to generate the first flag signal; and generating a second flag signal to indicate a value of a predetermined portion of the second delta value, the flag generation logic means being coupled to the arithmetic logic means to receive the second delta value and to generate the second flag signal.

3. The method of claim 2 further comprising the steps of:

inputting the first delta value as a first multiplier in the multiplication operation when the first flag signal is in a first predetermined logic state, the assignment logic means providing the third one of the plurality of boundary values as a first multiplicand;

inputting the third one of the plurality of boundary values as the first multiplier in the multiplication operation when the first flag signal is in a second predetermined logic state, the assignment logic means providing the first delta value;

inputting the second delta value as a second multiplier in the multiplication operation when the second flag signal is in the first predetermined logic state, the assignment logic means providing the fourth one of the plurality of boundary values as a second multiplicand; and inputting the fourth one of the plurality of boundary values as the second multiplier in the multiplication operation when the second flag signal is in the second predetermined logic state, the assignment logic means providing the second delta value as the second multiplicand.

4. The method of claim 1 wherein the fifth one of the plurality of boundary values is a saturation value, the saturation value being a greatest value in the membership set.

5. The method of claim 1 wherein the first one of the plurality of control signals is the same as the second one of the plurality of control signals and the step of, each of the first one and the second one of the control signals enabling the arithmetic logic means to subtract a first one of the plurality of boundary values from the input value and to concurrently subtract the input value from a second one of the plurality of boundary values.

6. The method of claim 1 wherein the third one of the plurality of control signals is the same as the fourth one of the plurality of control signals and, each of the third one and the fourth one of the control signals enabling the arithmetic logic means to multiply the first delta value and a third one of the plurality of boundary values and to concurrently multiply the second delta value and a fourth one of the plurality of boundary values.

7. A data processing system for performing a fuzzy logic operation, the fuzzy logic operation determining membership of an input point in a predetermined membership set defined by a plurality of boundary values, the data processing system comprising:

input means for receiving a membership evaluation instruction for initiating execution of the fuzzy logic operation in the data processing system, the input means also receiving the input point;

instruction decode means for decoding the membership evaluation instruction to provide a plurality of control signals, the instruction decode means coupled to the input means for receiving the membership evaluation instruction;

memory means for storing and providing the plurality of boundary values;

a register for storing a plurality of delta values during execution of the fuzzy logic operation;

an arithmetic logic circuit coupled to the memory means for selectively receiving each of the plurality of boundary values, the arithmetic logic circuit coupled to the input means for receiving the input point, the arithmetic logic circuit coupled to the instruction decode means for receiving a portion of the plurality of control signals, the arithmetic logic circuit coupled to the register for receiving a portion of the plurality of delta values, the arithmetic logic circuit generating one of a first and a second delta value and a first and a second product; and a result selector having a first input coupled to the arithmetic logic circuit for receiving the first delta value, a second input coupled to the arithmetic logic circuit for receiving the second delta value, a third input coupled to the arithmetic logic circuit for receiving the first product, a fourth input coupled to the arithmetic logic circuit for receiving the second product, and a fifth input for receiving a fifth one of the plurality of boundary values, the result selector providing a degree of membership signal, the degree of membership signal indicating the input point is not included in the predetermined membership set when one of the first delta value and the second delta value is less than zero, the degree of membership signal being equal to a minimum value of one of the first result, the second result, and the fifth one of the plurality of boundary values if neither the first delta value or the second delta value is less than zero.

8. The data processing system of claim 7 further comprising a flag generation circuit, the flag generation circuit coupled to adder circuit for receiving the first delta value and the second delta value, the flag generation circuit generating both a first flag signal to indicate a value of a predetermined portion of the first delta value and a second flag signal to indicate a value of a predetermined portion of the second delta value.

9. The data processing system of claim 8 further comprising an operand assignment circuit having a first input coupled to the memory means for receiving the third and fourth ones of the plurality of boundary values and a second input coupled to the flag generation circuit for receiving the first and second flag signals.

10. The data processing system of claim 7 wherein the arithmetic logic circuit generates the first delta value by subtracting a first one of the plurality of boundary values from the input value.

11. The data processing system of claim 7 wherein the arithmetic logic circuit generates the second delta value by subtracting the input value from a second one of the plurality of boundary values.

12. The data processing system of claim 7 wherein the arithmetic logic circuit generates the first product by multiplying the first delta value to a third one of the plurality of boundary values.

13. The data processing system of claim 7 wherein the arithmetic logic circuit generates the second product by multiplying the second delta value to a fourth one of the plurality of boundary values.

14. The data processing system of claim 7 wherein the arithmetic logic circuit generates the first and the second delta values in response to a first one of the plurality of control signals.

15. The data processing system of claim 14 wherein the first one of the plurality of control signals indicates that the first and the second delta values should be generated concurrently.

16. The data processing system of claim 7 wherein the arithmetic logic circuit generates the first and the second products in response to a second one of the plurality of control signals.

17. The data processing system of claim 16 wherein the second one of the plurality of control signals indicates that the first and the second products should be generated concurrently.

* * * * *